[15] 3,699,474
[45] Oct. 17, 1972

[54] MULTIPLE BEAM LASER SYSTEM

[72] Inventor: Murphy J. Landry, Albuquerque, N. Mex.

[73] Assignee: The United States of America as represented by the United States Atomic Energy Commission

[22] Filed: Nov. 20, 1917

[21] Appl. No.: 91,478

[52] U.S. Cl..............................331/94.5, 350/151
[51] Int. Cl...................................H01s 3/11
[58] Field of Search ..............331/94.5; 350/151

[56] References Cited

UNITED STATES PATENTS 3,293,565  12/1966  Hardy..................331/94.5
3,353,115  11/1967  Maiman................331/94.5

OTHER PUBLICATIONS

Helfrich, J. L., J. Applied Physics, Vol. 34, March 1963, pp. 1000–1001.
Kruzhilin, Y. I., Journal of Experimental Techniques, No. 1, pp. 160–161, Feb. 1966.
Spaeth et al., Applied Physics Letters, Vol. 9, No. 5, 1 Sept. 1966, pp. 179–181.

Primary Examiner—Ronald L. Wibert
Assistant Examiner—R. J. Webster
Attorney—Roland A. Anderson

[57] ABSTRACT

An optical laser system in which the active lasing medium is simultaneously pumped over the entire volume of the lasing medium while providing various means for controllably generating giant pulses at different points in time by sequentially Q-switching of separate and distinct parallel volumes of the lasing medium.

7 Claims, 12 Drawing Figures

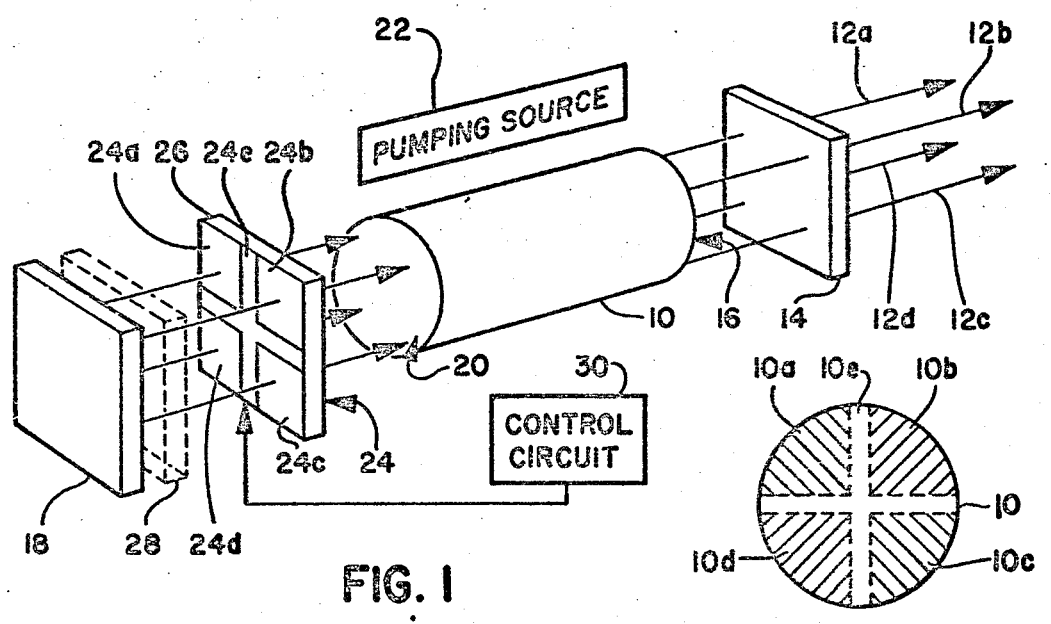
FIG. 1
FIG. 1a
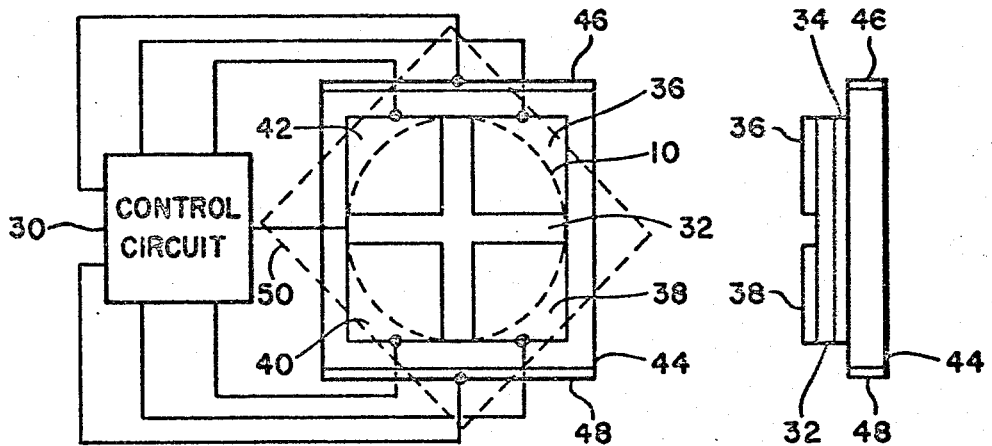
FIG. 2a
FIG. 2b
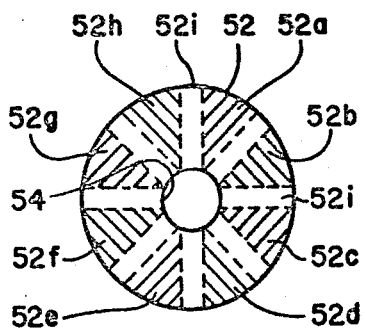
FIG. 2c
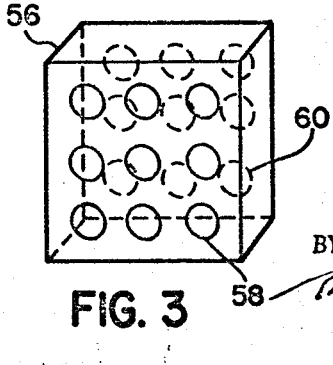
FIG. 3
INVENTOR.
MURPHY J. LANDRY

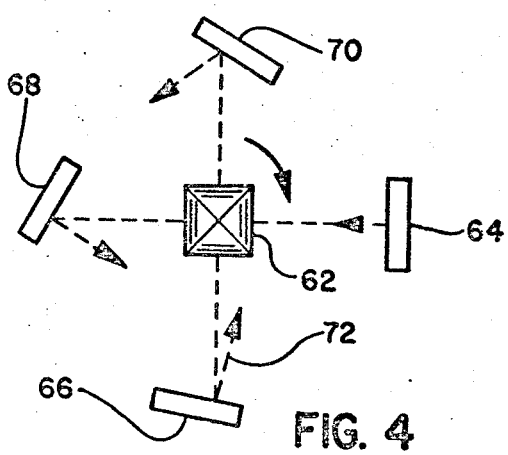
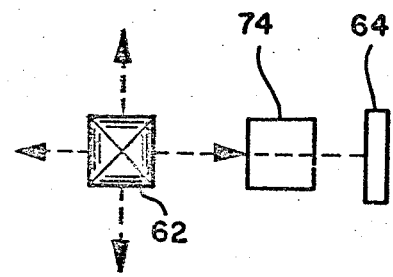
FIG. 4    FIG. 5
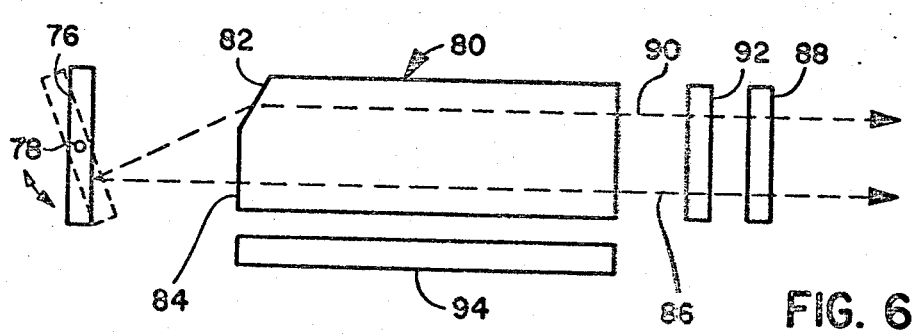
FIG. 6
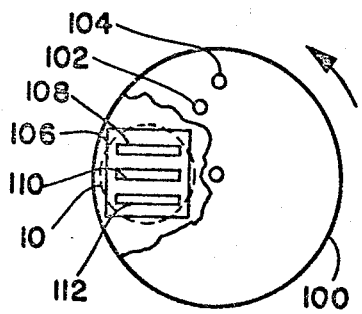
FIG. 7
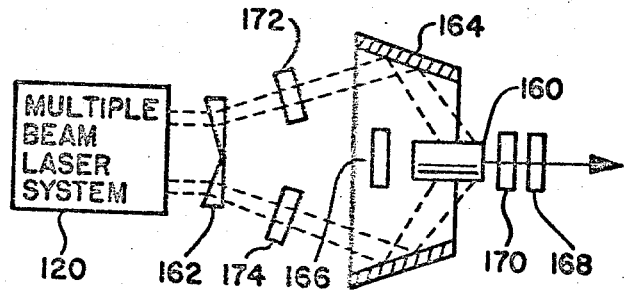
FIG. 9
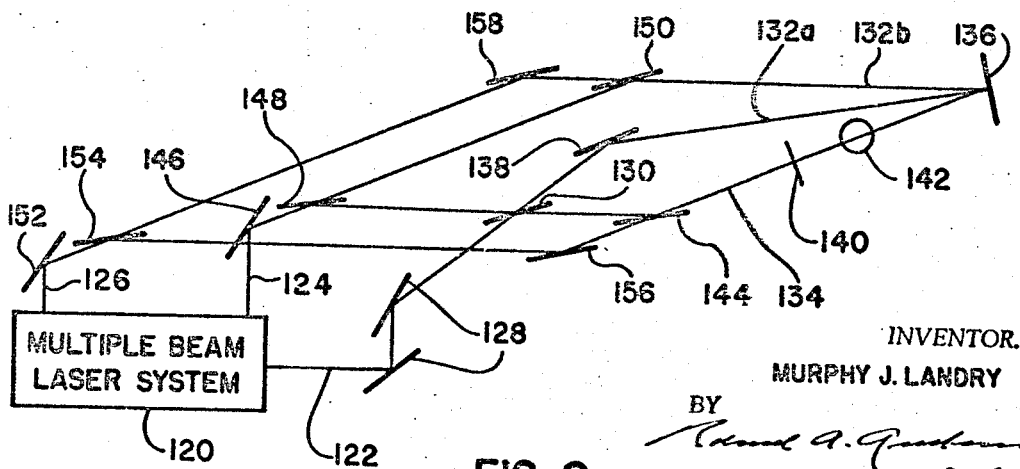
FIG. 8
INVENTOR.
MURPHY J. LANDRY

MULTIPLE BEAM LASER SYSTEM

BACKGROUND OF INVENTION

Optical lasers are commonly used in a wide range of applications. In many of these applications it is desirable that a lasing medium produce a high power, short duration light pulse by a technique referred to as giant pulse Q-switching. In the process of lasing, particularly in Q-switching, the lasing medium is expended and requires some period of time, depending upon the lasing material and the pumping level, to recover sufficiently to permit repopulation of atoms in the lasing medium to permit further lasing action to occur. Thus, the repetition rate at which a lasing medium may be lased is limited to the time interval required to repopulate atoms in the lasing medium. If an attempt is made to cause the lasing medium to lase before this time interval has passed, the laser light pulse produced, if any, will have considerably reduced power and intensity from pulses produced from completely recovered lasing mediums. The time interval between Q-switching laser pulses from one lasing medium in many prior systems may be greater than 100 nanoseconds with only two pulses available.

Some applications may require pulse repetition rates considerably faster than these time periods and in addition require more than two pulses. Such may be achieved by using multiple lasing mediums together with their associated pumping and optical cavity arrangements. Such multiple lasing medium systems may be very complex and require difficult timing procedures. In addition, many applications require only a portion of the laser light emitted from a lasing medium resulting in a relatively inefficient utilization of the laser power.

Some applications, particularly holography, prefer a laser pulse having long temporal coherence and high spacial coherence for effective use thereof. Holography, as well as plasma physics experiments, tracking systems, dye laser pumping, and high speed photography may also require a plurality of high energy, short time duration and coherent light pulses emitted over short, and possibly variable, sequential repetition rates to the point of even overlapping each other. In some of these uses, it may also be desirable that the laser light pulses be emitted along spatially separated parallel or diverging paths without requiring complex optical deflection techniques or reduction of available power.

Some prior multiple pulse laser systems utilize common lasing volumes or portions thereof. In such systems, the laser pulses produced by the common volumes will be of different amplitudes and energy and be limited in repetition rate. Still other multiple pulse laser systems produced multiple laser light pulses which may not be as precisely controlled as may be desired and may present difficulties, because of the characteristics of the emitted pulses, in control thereof, especially for high energy pulses per volume lasing element and for large numbers of volumes, as well as to achieve any giant pulses.

SUMMARY OF INVENTION

In view of the above, it is an object of this invention to provide novel optical laser systems which are capable of producing precision laser light pulses at a greater frequency than the normal time interval required to permit a lasing medium to lase and be repopulated.

It is a further object of this invention to provide lasing systems which produce multiple laser light beams from a single active lasing medium having essentially equal laser pulse characteristics including amplitudes and energies.

It is a further object of this invention to provide multiple pulse laser systems in which the sequential time interval between pulses may be readily varied.

It is a still further object of this invention to provide laser systems capable of producing a large number of variably spaced pulses.

Various other objects and advantages will appear from the following description of embodiments of the invention, and the most novel features will be particularly pointed out hereinafter in connection with the appended claims. It will be understood that various changes in the details, materials and arrangements of the parts, which are herein described and illustrated in order to explain the nature of the invention may be made by those skilled in the art.

The invention comprises an optical laser system in which an optical lasing medium produces a plurality of laser pulses from a plurality of separate and distinct parallel lasing volumes in a single lasing medium with separately controllable Q-switches in the optical cavity of each separate lasing volume.

DESCRIPTION OF DRAWING

The invention is illustrated in the accompanying drawings wherein:

FIG. 1 is a perspective, diagrammatic view of a lasing system incorporating features of this invention;

FIG. 1a is an end view of the lasing medium used in the system of FIG. 1 showing the location of the lasing volumes;

FIGS. 2a and 2b are elevation front and side views of a ferroelectric ceramic optical shutter which may be used to Q-switch the lasing medium of FIG. 1 either singly or in segments, and FIG. 2c is an end view of a modified lasing medium showing locations of lasing volumes using overlapped optical shutters;

FIG. 3 is a perspective view of an electro-optic shutter array;

FIG. 4 is an alternative embodiment of the multiple pulse laser system in which a multifaceted prism is rotated to effect Q-switching of the lasing volumes;

FIG. 5 is a diagrammatic view of a portion of a modified arrangement of the system shown in FIG. 4;

FIG. 6 is a diagrammatic view of an alternate embodiment utilizing a faceted lasing medium and a rotating mirror to effect Q-switching;

FIG. 7 is an end view of a portion of another embodiment of the Q-switched multiple beam laser system;

FIG. 8 is a diagrammatic view of a multiple beam laser system used in a holographic arrangement; and FIG. 9 is a diagrammatic view, partially in cross section, of a multiple beam laser system and dye laser pumping arrangement.

DETAILED DESCRIPTION

A giant pulse, Q-switched, multiple beam laser system utilizing a single lasing medium 10 which is capable of producing a plurality of precise, equal intensity laser light pulses from parallel, discrete active lasing volumes is shown in FIG. 1. The plurality of laser light beams produced by the system, shown for purpose of illustration in FIG. 1 as beams 12a, 12b, 12c and 12d, are produced by separate and distinct optical cavities, each of which includes separate and controllable optical Q-spoiling devices disposed therein in the path of the laser light pulse. The Q-spoiling devices are preferably such that can be controlled in a manner to increase the Q, that is the measure of light gain to loss of an optical cavity, of separate optical cavities at any desirable time or interval. The laser light pulses are also preferably produced in optically parallel and separate volumes of the single lasing medium 10 so that the separate laser light pulses receive their energy from entirely different volumes of the lasing medium, with little or no cross-talk therebetween. In many applications, it is also desirable that the separate laser light pulses be produced with the same characteristics, including such things as polarization, light intensity and energy.

The lasing medium may be any conventional solid state, gaseous, liquid, or semiconductor lasing material having a high degree of homogeneity and limited light scattering characteristics with the capability of achieving giant pulses. Such a lasing medium may be a ruby ($Al_2O_3:Cr^{3+}$) crystal of standard or better quality grown by conventional techniques such as by the Czochralski process.

The separate Q-spoiling devices may be any device or arrangement of devices which will produce the desired Q-switching of a laser optical cavity and which can be controlled to a sufficient degree to provide desired pulse durations and intervals without detrimentally increasing light scattering within optical cavities. Such Q-spoiling devices may include rotating mirrors, rotating apertured discs, Kerr cells, Pockels cells, Faraday rotators, ferroelectric ceramic optical shutters, and the like, as will be described hereinafter in greater detail.

Referring again to FIG. 1, the optical cavities for laser light beams 12a, 12b, 12c and 12d may be formed by a partially reflecting mirror 14 adjacent or near one end of lasing medium 10 which will reflect a desired percentage of the light emitting from medium 10 back into the medium while transmitting the rest of the light beam as indicated by the parallel arrows. Mirror 14 may be coextensive with a substantial portion of the area of the lasing medium 10 or it may be two or more separate mirrors so long as they are disposed perpendicular to the laser light beam direction. If it is desired in some applications, mirror 14 may be eliminated while using the uncoated or a partially reflective coated end surface 16 of medium 10 in place thereof. With this latter arrangement, inherent Fresnel reflections may be used to provide the desired partial reflectivity.

The optical cavities for the laser light beams are completed by an appropriate mirror 18. Mirror 18 is positioned optically in parallel with mirror 14, or surface 16 depending upon which is used as the partially reflective means, and perpendicular to the laser light beam direction.

The other light emitting surface of lasing medium 10, that is surface 20, may be coated with an appropriate antireflective material which will enhance the lasing action of the lasing medium in a manner well known in the art.

Lasing medium 10 may be optically pumped to cause excitable atoms in the medium to undergo a population inversion with suitable radiation energy generating source or device 22 such as with flash lamps, a continuous lamp, or the like. One or more radiation pumping devices may be utilized which simultaneously excite the entire lasing medium 10 throughout its active volume. The pumping device may be activated at the same time or in sequence or continuously pumped depending upon the time interval between lasing of the respective lasing volumes of lasing medium 10. Where sufficiently long time intervals between lasing pulses are desired, more than one radiation pumping source activated in sequence or a continuously radiating pumping source may be needed to maintain the population inversion of the respective lasing volumes until they are Q-switched.

The plurality of parallel optical cavities, one for each laser light beam, are formed and controlled by an appropriate Q-spoiling device 24 positioned between mirrors 14 and 18 (or between mirror 18 and end 16) in the path of the laser light beams. Q-spoiling device 24 preferably includes an array of electrically controlled areas or locations 24a, 24b, 24c and 24d arranged in a desired pattern separated by spacing 24e over a single electro-optical crystal 26 having birefringence which may be electrically changed from one level to another in the separate areas 24a, 24b, 24c and 24d. The change in birefringence must be sufficient to effect an increase in the Q or quality factor of the optical cavity aligned with the area being controlled either by itself or in combination with an appropriately oriented polarizer and/or analyzer system 28. Each of the respective areas should be selectively controlled or "-switched" by an appropriate control circuit 30.

Control circuit 30 may include any appropriate electrical pulse circuit elements which produce electrical signals to initiate the Q-spoiling device in an appropriate manner and speed by application of appropriate electrical pulses or interruption of a continuous voltage or current. Also, the control circuit 30 may include preset or variable time delay elements to initiate the respective Q-spoiling devices in a desired sequence and time interval.

The controlled areas 24a, 24b, 24c and 24d of crystal 26 are shaped so as to provide and be coextensive with discrete active volumes of lasing medium 10. These volumes within lasing medium 10 are shown by shaded positions 10a, 10b, 10c and 10d in FIG. 1a, each of which are separated by an inactive volume 10e greater than the spacing 24e of Q-spoiler 24. In most applications it is desirable that the active volumes be in the generally "pie" or wedge shape shown to insure uniform laser light pulse outputs. The laser light pulses from each of the optical cavities are of equal intensity and energy and are polarized in the same direction.

Using a ruby crystal ($Al_2O_3:Cr^{3+}$ 0.05 percent) about 16.8 centimeters long and 0.952 centimeters in diameter, lasing volumes shaped generally like volumes 10a, 10b, 10c and 10d may be achieved with a separation volume 10e having a width about 0.4 millimeter or less. Laser light pulses having a pulse width at half power of about 25 nanoseconds may be generated with time separations between pulses varying from less than 60 nanoseconds to about 4 microseconds. Smaller time separations between active lasing volumes may be achieved along with greater (a millisecond or more) time separation between pulses using appropriate high quality optical elements and sequentially operated radiation pumping sources. The high directivity and high degree of coherence is preserved in each laser light beam path. Repetitive sequential switching of these volumes may also be achieved with suitable pumping to provide a large number of pulses from the single lasing medium, such as greater than 200 pulses per second at 0.75 joule energy per pulse.

An appropriate Q-spoiling device array is shown in FIGS. 2a and 2b. The Q-spoiling device in this embodiment is an array of ferroelectric ceramic optical shutters. The Q-spoiling device array includes a single ferroelectric ceramic optical element 32 having a transparent electrode 34 disposed along one surface thereof and an array of spaced apart transparent electrodes 36, 38, 40 and 42 disposed about another surface thereof opposite to electrode 34. This sandwiched arrangement of transparent electrodes and ferroelectric ceramic element is mounted with a suitable transparent adhesive on a transparent ferroelectric ceramic element 44 having a pair of electrodes 46 and 48 disposed at either end thereof. The Q-spoiling device array may be positioned adjacent an end of lasing medium 10 in the general position shown by the superimposed dotted circle in FIG. 2a. The various elements and electrodes are shown for purpose of illustration with exaggerated thicknesses. In actual device, element 32 and the electrodes are generally very thin an considerably thinner than element 44.

When an appropriate voltage is applied across electrodes 46 and 48 by power supply or control circuit 30, element 44 will elongate in the direction of the poling field. The elongation of ferroelectric element 44 will in turn effect an elongation of ferroelectric element 32 fastened thereto and produce a strain biasing thereof. This strain biasing, in turn, produces some level of birefringence within ceramic element 32 which retards components of polarized light passing from lasing medium 10 therethrough. With the application of a biasing field between electrode 34 and any one or more of the array of electrodes 36, 38, 40 and 42, a portion of the ferroelectric ceramic material therebelow is polarized in a different direction producing a different level of birefringence. This difference in birefringence, in combination with an appropriate polarized light analyzer 28, may permit passage of light polarized by medium 10 by transmitting a maximum of a component of the polarized light through element 32 underneath the respective biased electrode. Thus, the ferroelectric ceramic material of ceramic element 32 under each of the electrodes 36, 38, 40 and 42 may be made selectively and separately "transparent" to effect lasing of a lasing volume aligned with respective portions of ferroelectric ceramic element 32. Each of the lasing volumes will have the generally "pie" or wedge shape described above with a separation defined by and greater than the electrode array separation, as shown by the superimposed lasing medium 10 and the electrode array.

If an additional ferroelectric ceramic, electrode array and strain producing ferroelectric strain element arrangement, as shown by dotted line 50 in FIG. 2a, is positioned at an angle to the array described, selective biasing of appropriate array electrodes may further divide the lasing medium into smaller wedge shaped lasing volumes. With an arrangement 50 having four electrodes similar to electrodes 36, 38, 40 and 42 and positioned at an angle of 45° to the other array, eight equal wedge shaped volumes may be achieved. Any number of such ferroelectric ceramic arrangements and proper angle orientations may be utilized to provide desired numbers of Q-switched laser volumes within lasing medium 10.

FIG. 2c illustrates a lasing medium 52 divided into eight active volumes 52a–52h separated by inactive volumes 52i. Lasing medium 52 may be provided with a central bore 54, as shown, to minimize overlap between active lasing volumes near central portions thereof and to facilitate getting more uniform pulses from each volume.

In this arrangement, a longitudinal mode of operation is used. Other arrays or arrangements of ferroelectric ceramic electro-optical devices and other modes of operation, such as the transverse mode, may be utilized so long as they have sufficiently rapid switching speeds for Q-switching laser materials. Some other devices and modes of operation are described in U.S. Pat. No. 3,499,704 to Land and McKinney, U.S. Pat. No. 3,512,864 to Haertling, Land and McKinney and U.S. Pat. No. 3,531,182 to Land and Schueler.

Other Q-spoiling device arrays may be utilized in various configurations, such as in as in a 3 × 3 matrix array shown in FIG. 3. In this embodiment, the array is positioned in the path of laser light emitted from the lasing medium in the same manner as Q-spoiling device 24 in FIG. 1, as described with respect to the ferroelectric shutter array of FIGS. 2a and 2b. This array may include a single crystal 56 which functions as a Pockels cell crystal or the like or an array of individual crystals and which may be energized by an array of transparent or ring electrode pairs on the opposite surfaces of crystal 56, such as electrodes 58 and 60. Each of the electrode pairs may be separately energized by an appropriate control circuit (not shown) to provide lasing of a lasing volume aligned optically with the respective electrode pairs. Since the lasing medium is generally pumped by radiation traveling radially inwardly through the lasing medium, the atom population inversion is generally greater or enhanced towards the center of the lasing medium. Thus, the lasing volume which is aligned with corner electrode pairs, such as electrodes 58 and 60, will lase at a lower energy then the lasing volume associated with the central electrode pair while the other four electrode pair lasing volumes will energize at a level intermediate thereof. Since many applications require or prefer laser pulses of equal intensity and energy, it may be desirable to provide coatings of different levels of light transmissivity over respective combinations of electrode pairs to equalize the laser pulse light outputs from each of the lasing volumes. It will be noted in the embodiments described above, that the lasing volume of each of the laser light beam outputs were arranged to provide lasing from equally pumped lasing volumes.

Separate multiple beam lasing may also be achieved by positioning a multifaceted rotating prism, reflector or mirror in place of Q-spoiling device 24 and mirror 18 of FIG. 1 with apex thereof facing and in alignment with the longitudinal axis of lasing medium 10. Such a rotating prism is shown in FIG. 4 by pyramidal prism 62 rotating in the direction of the arrow. Appropriate mirrors 64, 66, 68 and 70 may be arranged about prism 62 at different angles with respect to the laser light beam paths reflected from the prism. The mirrors can be placed at any desired angle and combination of angles with respect to the laser light beams to effect any desired time sequence between lasing of the respective lasing volumes of lasing medium 10. Referring to FIG. 4, at a given position during revolution of prism 62, mirror 64 is in alignment with and optically parallel to mirror 14 forming an optical cavity therewith. At this point in time, the facet of prism 62 which is facing mirror 64 will cause the corresponding active volume of lasing medium 10 to lase and emit a laser light pulse. Mirror 66 is at an angle X out of optical parallelism with mirror 14 causing the laser light beam to be reflected in the direction of the arrow 72 away from the laser optical cavity preventing lasing of the corresponding lasing volume at that time. Mirror 68 is at some angle such as 2X while mirror 70 is at some angle such as 3X from optical alignment with mirror 14 to reflect the laser light beams back into the respective cavities at an appropriate time. With the position shown, mirrors 66, 68 and 70 will each correspondingly reflect the laser light beam away from the optical cavities. The positions of mirrors 66, 68 and 70 are shown for purpose of illustration at generally exaggerated angles, as these will angles are generally quite small. As prism 62 rotates, facets thereof will come into alignment with mirrors 66, 68 and 70 in sequence. With this arrangement, only one mirror will be in alignment at a time with the mirror 14 and its respective facet of prism 62. Since alignment of all mirrors will be effected four times on each revolution of prism 62, an electrically controlled Q-spoiling device is preferably positioned between prism 62 and lasing medium 10 or between lasing medium 10 and mirror 14 so as to block or inhibit passage of light along the optical cavities except during a particular revolution or series of revolutions of prism 62.

If the prism is rotated at a speed of about 24,00 revolutions per minute (rpm) with an angle X equal to 57.6 seconds of arc, the laser light pulses will be separated by an interval of about 25 nanoseconds. Thus, the time interval between pulses may be adjusted by appropriate positioning of mirrors 64, 66, 68 and 60 and by selection of the rotation speed of the prism. This sequence of pulses may be repeated by activation and deactivation of the electrical Q-spoiling device about every 10 to 50 microseconds depending on the duration of the radiation pumping source 22 energization. Also, a single or limited pulse output from each cavity may be assured by use of an appropriate cavity extender or liquid dye in cavity between the electrically controlled Q-spoiler and lasing medium 10, in a well known manner.

If the particular application requires it, the rotating prism may be positioned at an angle to the axis of lasing medium 10 by appropriate mirrors or other reflecting devices which will modify the respective optical paths or cavities accordingly.

Instead of placing mirrors 64, 66, 68 and 70 at different angles with respect to the laser light beam paths and rotating prism 62, prism 62 may be maintained in a given position with the mirrors positioned perpendicular to the laser beam paths and individual electro-optical Q-switching shutter positioned in each laser beam path, as shown by shutter 74 and mirror 64 shown in FIG. 5. In this arrangement, lasing of the individual volumes may be controlled by the separate shutters and by polarizers or analyzers, if appropriate.

Additional lasing volumes and laser light pulses may be produced by providing additional facets on prism 62 together with associated mirrors and/or Q-spoiling devices, limited only by the size of the lasing medium, the energy requirements of the laser light pulses and, to some extent, the minimum spacing requirements between active lasing volumes.

Multiple beams may also be achieved using a rotating prism or planar mirror 76, which rotates about an axis 78 in the direction of the arrows, and a lasing medium 80 having a multifaceted surface facing mirror 76, as shown in FIG. 6. In this embodiment, the surface of lasing medium 80 facing mirror 76 has a surface 82 at an angle to another surface 84. It will be understood for purposes of this invention that additional facets at other angles to each other may be utilized and that for illustration purposes the facets are shown at exaggerated angles. With the mirror 76 in the position shown in solid lines the laser light beam path 86 will be in alignment and perpendicular therewith and with partially reflecting mirror 88 and the lasing volume of lasing medium 80 which is behind facet 84 so as to effect lasing thereof. As mirror 76 rotates to the position shown in dotted lines the refraction of the lasing medium material will cause light traveling along lasing light beam path 90 to be in optical alignment and perpendicular with mirror 76 and mirror 88 through the lasing volume of lasing medium 80 behind facet 82, causing lasing thereof. In the same manner as described with respect to FIG. 4 an electrical Q-spoiling device 92 may be positioned in optical paths 86 and 90 since the lasing volumes of facets 82 and 84 will attempt to lase during every revolution of mirror 76 so long as the radiation pumping source 94 is emitting pumping radiation.

With an angle between facets 82 and 84 of 68.25 seconds of arc and a mirror 76 rotation of about 400 revolutions per second, the interval between laser pulses from the respective lasing volumes will be about 100 nanoseconds. With additional facets, additional pulses may be achieved. By proper selection of facet angles and mirror rotation speeds, laser pulse intervals may be varied over a wide range.

Multiple laser pulse outputs from a single lasing medium may also be produced by using a rotating opaque disc 100, as illustrated in FIG. 7, having one or more apertures 102 and 104 which are suitably rotated about the axis of disc 100 past a lasing medium 10 which is masked by an opaque plate 106 having one or more open slots 108, 110, and 112 therein. The disc 100 and the mask plate 106 are positioned within the optical cavity of a laser system so as to block passage of light therealong, such as in place of Q-spoiling device 24 in FIG. 1. As the disc 100 rotates in front of suitably pumped lasing medium 10 to bring an aperture in alignment with a slot in mask 106, the lasing medium will lase along a volume defined by the dimensions of the superimposed aperture and slot. With a single aperture and a single slot, lasing may be achieved of a particular lasing volume of lasing medium 10 on every revolution of disc 100. To achieve lasing of additional volumes, additional slots may be provided in mask 106, as shown, limited only by the separation requirements between lasing volumes. Still further lasing volumes may be provided by positioning additional apertures in disc 100 positioned at different radial locations on disc 100, and/or, if desired, at different angular positions thereof. The time interval between pulses will be dependent upon the speed of revolution of disc 100, the relative positions of the apertures in disc 100 and the relative positions of the slots in mask 106. With a disc rotation of about 24,000 RPM, time intervals between light pulses of from coincidence to 10 microseconds may be achieved. The duration of the laser light pulses will be determined by the time required for an aperture to traverse a slot.

It will be understood that other variations or combinations of aperture and slot configurations and positions of disc 100 may be used together with electro-optical or other Q-switching devices, where appropriate to achieve giant pulses with desired beam size and energy.

There are many applications which find it particularly desireable to use a laser system capable of producing a plurality of parallel laser light beams emitted over a wide range of laser light pulse time intervals from coincidence to milliseconds and in which the time intervals are readily controlled. Such a multiple beam laser system 120, made in accordance with any of the embodiments shown and described above, may find particular application in holographic processes as illustrated in FIG. 8. For purposes of illustration, system 120 is shown with three laser light beam outputs 122, 124 and 126 which are emitted at different points in time, designated as times $t_1$, $t_2$ and $t_3$ respectively, with some overlapping therebetween. The first beam 122, emitted at time $t_1$, is directed by reflectors 128 to beam splitter 130. Beam splitter 130 divides the beam along a reference beam path 132a and an object beam path 134. The reference beam is directed against a holographic film plate 136 by reflector 138 while the object beam is directed through a diffuser 140 and object 142 against film plate 136 by beam splitter 144. With this arrangement, a hologram of object 142 will be recorded in film plate 136 at the angle provided between the reference and object beams for the duration of beam 122.

At time $t_2$, beam 124 is deflected by reflector 146 to beam splitter 148. Beam splitter 148 divides the beam into two portions, a first portion being directed to beam splitter 130 to form a reference and object beam in the same manner as beam 122 described above and a second portion being directed by beam splitter 150 along reference beam path 132b, against film plate 136. The portion of beam 124 which follows path 134 thus acts as the object beam for both reference beam paths 132a and 132b to provide holograms at two angles for the duration of beam 124.

At time $t_3$ beam 126 is deflected by reflector 152 to beam splitter 154. Beam splitter 154 divides the beam into two portions, one portion being deflected by reflector 156 along object beam path 134 and the other portion being deflected by reflector 158 along reference beam path 132b. Beam 126 thus forms a hologram at the same angle as the second portion of beam 124 for the duration of beam 126. Beam 126 may be divided by reflector 152 to form a reference beam at still another angle with respect to object beam path 134, if desired.

Additional beams from laser system 120 may be acted upon in a like manner to record holograms at additional angles and points in time, where appropriate. Also, other techniques may be used to deflect the various beams to other reference beam angles, such as by acoustical deflectors, to achieve additional holograms. It will be understood that the various reference beams generally should be about equal or greater in intensity than the object beam. Such may be accomplished by using attenuators in various beam paths and/or suitable combinations of beam splitters and mirrors for the described reflectors.

After recordation of the respective holograms at the various recording angles, film plate 136 may be developed and suitably positioned for analysis thereof. When the developed film plate is illuminated with the same wavelength light at angles corresponding with the respective reference recording angles, the original object may be viewed with fringes superimposed which are related to the motion of the object between the time periods of the beams which recorded at those angles. Thus, by changing the angle of the illuminating light, the recorded motion of the object may be later viewed for any time period and time segments, as selected and determined by laser operation. As described previously, time segments down to 4–5 nanoseconds may be achieved with recordings lasting for periods of 4–5 nanoseconds with multiple beam laser systems as described above.

Multiple beam laser system 120 may also be used to optically pump a dye laser 160, as shown in FIG. 9. In this arrangement, parallel, laser pulse outputs from system 120 may be deflected by an annular or segmented optical wedge 162 and either a plurality of plane mirrors or an annular mirror 164 against dye laser 160. Dye laser 160 is positioned between mirrors 166 and 168 of an optical cavity with an appropriate tuning element 170, such as a Fabry Perot etalon or Lyot filter, positioned within the cavity. The effect of this arrangement is to direct the separate and discrete laser light pulses from system 120 against different portions of dye laser 160 about the periphery thereof. By proper selection of laser pulse shapes and timing and wedge-reflector positions and configurations, every portion of dye laser 160 may be made to lase in sequence over its entire volume. In order to effect lasing of laser 160 with the wavelength of light emitted by lasing medium in system 120, appropriate frequency multipliers 172 and 174 or the like may have to be positioned in the various optical paths. A dye laser may be power. in this manner to produce many pulses with megawatts of powre.

What is claimed is:

1. A Q-switched optical laser system comprising a lasing medium; means for simultaneously pumping the entire lasing medium to increase stored energy therein; a partially reflective means adjacent an end of said lasing medium for reflecting a portion of the radiation emitted from said lasing medium back into said lasing medium; totally reflective mirror means disposed near the other end of said lasing medium optically aligned through said lasing medium with said partially reflective means; Q-spoiling means disposed between said mirror means and said partially reflective means for effectively spoiling the reflectivity of said mirror means and for forming at least three parallel, discrete, nonoverlapping, longitudinal active lasing volumes in said lasing medium and a plurality of discrete optical lasing cavities with said partially reflective means; and means associated with said Q-spoiling means for separately controlling and increasing the Q of each of said distinct lasing volumes and optical lasing cavities to initiate lasing thereof and for producing a separate, parallel, giant laser light beam pulse of substantially equal amplitude and energy from each of said lasing volumes separated in time from each other over selectable time intervals from pulse coincidence to the threshold population inversion duration of said medium and with selectable sequences.

2. The laser system of claim 1 wherein said optical Q-spoiling means is an array of electro-optical shutters disposed on a single electrically variable birefringent ferroelectric ceramic optical element.

3. The laser system of claim 1 wherein said Q spoiling means comprises a plurality of spaced apart reflectors.

4. The laser system of claim 3 wherein said lasing medium is generally cylindrical in shape and said system includes a pyramidal reflector means having a plurality of reflective facets extending from an apex aligned with the longitudinal axis of said lasing medium for reflecting a portion of the light emitted from said lasing means to each of said plurality of reflectors.

5. The laser system of claim 1 wherein said lasing medium includes a bore along its longitudinal axis and said Q-spoiling means divides said lasing medium into said plurality of lasing volumes in discrete segments expanding radially outwardly from said bore.

6. The laser system of claim 1 including a dye laser and means for sequentially directing each of said laser light beams from said plurality of parallel active lasing volumes against and into discrete and radial longitudinal segments of said dye laser for effecting sequential and separate pumping and lasing of each of said discrete segments of said dye laser.

7. The laser system of claim 1 wherein said Q spoiling means includes a slotted mask disposed across the face of said lasing medium, an apertured disc, and means for rotating the apertures of said disc past said slotted mask between said lasing medium and said mirror.

* * * * *